F. S. ARMSTRONG, Jr.
SELF LUBRICATING PIT CAR WHEEL.
APPLICATION FILED APR. 29, 1910.
977,360.
Patented Nov. 29, 1910.
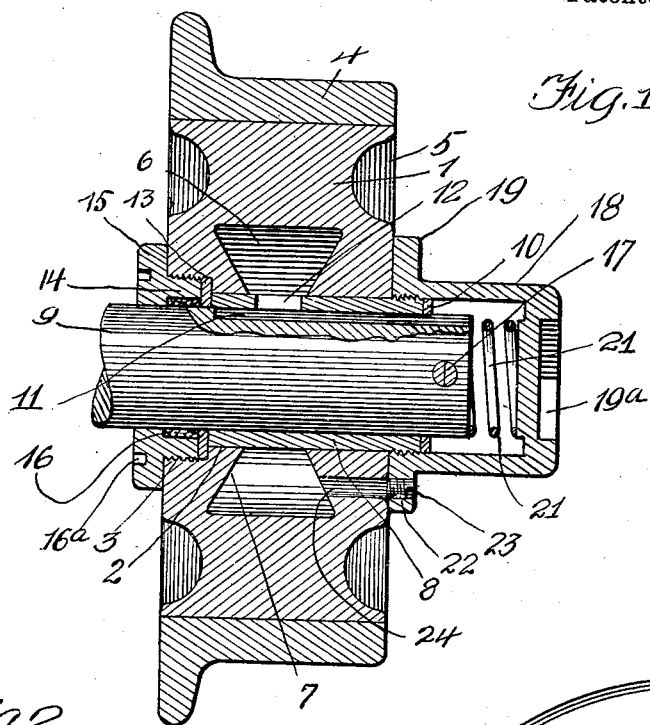
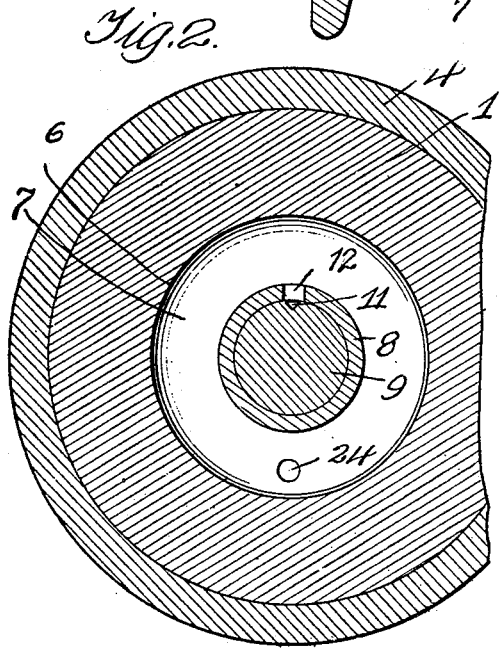
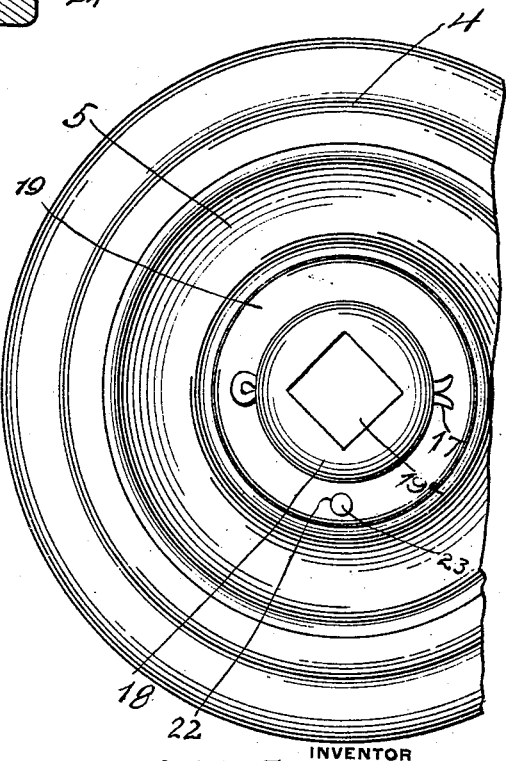
WITNESSES
Samuel Payne.
K. H. Butler
INVENTOR
F. S. Armstrong Jr.
by H. C. Everett & Co.
Attorneys

UNITED STATES PATENT OFFICE.

FRANK S. ARMSTRONG, JR., OF GREENSBURG, PENNSYLVANIA, ASSIGNOR OF ONE-HALF TO ROBERT GOTTLEIB, OF GREENSBURG, PENNSYLVANIA.

SELF-LUBRICATING PIT-CAR WHEEL.

977,360.　　　　　Specification of Letters Patent.　　Patented Nov. 29, 1910.

Application filed April 29, 1910. Serial No. 558,357.

*To all whom it may concern:*

Be it known that I, FRANK S. ARMSTRONG, Jr., a citizen of the United States of America, residing at Greensburg, in the county of Westmoreland and State of Pennsylvania, have invented certain new and useful Improvements in Self-Lubricating Pit-Car Wheels, of which the following is a specification, reference being had therein to the accompanying drawing.

This invention relates to self-lubricating pit car-wheels, and the primary object of my invention is to provide a car-wheel body with a lubricant receptacle adapted to supply lubricant to the axle or spindle of the wheel, to insure an easy and non-frictional rotation of the wheel upon the axle or spindle, and to avoid the necessity of lubricating the wheels of a pit car after each trip from a mine to a coal tipple.

A further object of my invention is to provide a wheel of the above type with a body that can be easily cast to provide a lubricant receptacle, the body being provided with an indurate rim and a bushing adapted to receive the spindle or axle of the car, the bushing being provided with an opening to establish communication between the lubricant reservoir of the wheel body and the axle, while the axle is provided with a groove adapted to equally distribute the lubricant upon the wearing surfaces of the axle and bushing. Provision is made whereby the lubricant reservoir or receptacle can be easily filled, also to prevent the waste of lubricant.

With the above and such other objects in view as may hereinafter appear the invention consists of the novel construction, combination and arrangement of parts to be hereinafter specifically described and then claimed.

Reference will now be had to the drawing forming a part of this specification, wherein:

Figure 1 is a vertical cross sectional view of a pit car-wheel constructed in accordance with my invention. Fig. 2 is a vertical cross sectional view of a portion of the wheel, and Fig. 3 is a view in elevation of a portion of the wheel.

In the accompanying drawings the reference numeral 1 denotes a cylindrical body having a bore 2, with the end of the bore upon the inner side of the wheel enlarged to form an annular seat 3 having the walls thereof screw threaded. The periphery of the body 1 is provided with a rim 4 shrunk or otherwise mounted upon the body, and the sides of the body are provided with annular recesses 5 to reduce the weight of the same. In the body is formed an annular lubricant reservoir or compartment 6 communicating with the bore 2, said reservoir or receptacle having tapering side walls 7 adapted to convey the lubricant therein toward the bore 2.

Mounted in the bore 2 is a bushing 8 extending from the seat 3 through the bore and protruding from the outer side of the wheel body, said protruding end being screw threaded. Extending into the bushing 8 is the spindle 9 of an axle, said spindle protruding beyond the outer end of the bushing 8 and having fitted thereon a washer 10 adapted to bear against the outer end of the bushing. The top surface of the spindle 9 is provided with a longitudinal groove 11 extending from the inner end of the bushing to the outer end of the spindle, and this groove is adapted to communicate with the lubricant reservoir or receptacle 6 through the medium of a slot 12 formed in the bushing 8.

Mounted in the seat 3 of the bore 2 is a wearing washer 13 encircling the spindle 9 and bearing against the inner end of the bushing 8, and engaging said washer is the collar 14 of a packing-gland 15, said collar being screwed in the seat 3 of the wheel body 1.

Mounted transversely of the end of the spindle 9 is a cotter pin or key 17, and encircling the outer end of the spindle 9 and the bushing 8 is a cap 18, which is screwed upon the threaded end of the bushing, said cap having an annular flange 19, while the outer end thereof is provided with a socket 19ª for a wrench. In the cap 18 is placed a coiled spring 21, said spring bearing against the end of the spindle and normally retaining the gland 15 out of engagement with a bolster or car body, thus preventing the gland from wearing the sides of the bolster or car body.

The flange 19 of the cap is provided with a threaded opening 22 adapted to be normally closed by a detachable plug 23. The opening 22 is adapted to register with a port 24 formed in the body of the wheel and communicating with the reservoir or receptacle 6. By removing the plug 23 the reservoir or receptacle can be easily filled. The outer end of the port 24 is reamed, whereby the plug 23 can easily enter said port.

The wearing washer 13 serves functionally as a dust-ring or guard, and it is preferable to place a felt washer 16 in the gland to prevent the lubricant from wasting by passing between the gland and the spindle. In order that the gland can be easily mounted in the seat 3, it can be provided with recesses 16$^a$ for a spanner wrench or other instrument (not shown).

The wheel body can be made of one piece and the periphery thereof hardened and tempered to form a rim.

With the spindle 9 held stationary by the car the wheel can easily revolve upon the spindle and freely distribute lubricant upon the wearing surfaces of the spindle and bushing. The capacity of the lubricant reservoir or receptacle is such that this receptacle need only be filled every six or twelve months, even when continuously used.

While in the drawings I have illustrated a preferred embodiment of the invention, it is to be understood that the structural elements thereof can be varied or changed, as to the size, shape and manner of assemblage without departing from the scope of the invention as defined by the appended claim.

What I claim, is:

In a self-lubricating wheel, the combination with a spindle, of a wheel body, said body having a bore formed therein, said body having an annular lubricant reservoir formed therein, a bushing mounted in said bore and adapted to receive said spindle, said bushing having an opening formed therein communicating with said reservoir, said spindle having a longitudinal groove formed therein adapted to receive lubricant from the opening of said bushing, a gland mounted in one side of said wheel body, a cap carried at the opposite side of said wheel body and inclosing the end of said spindle, said cap having a flange adapted to engage said wheel body, said flange having an opening formed therein, said wheel body having a port formed therein establishing communication between said reservoir and said opening, a plug detachably mounted in the opening of said flange, and a spring mounted in said cap between said cap and the end of said spindle, substantially as described.

In testimony whereof I affix my signature in the presence of two witnesses.

FRANK S. ARMSTRONG, Jr.

Witnesses:
 HARRY E. BLANK,
 C. J. McKLOEEN.